(12) United States Patent
Hamilton et al.

(10) Patent No.: US 11,360,955 B2
(45) Date of Patent: Jun. 14, 2022

(54) PROVIDING CUSTOM READ CONSISTENCY OF A DATA OBJECT IN A DISTRIBUTED STORAGE SYSTEM

(71) Applicant: eBay Inc., San Jose, CA (US)

(72) Inventors: Scot Fraser Hamilton, Dublin, CA (US); Rekha Patel, Cupertino, CA (US); Satya Seethasridhar, San Jose, CA (US); Nicholas Whyte, San Jose, CA (US); Parikshit Arora, San Jose, CA (US); Snezana Sahter, San Jose, CA (US)

(73) Assignee: eBay Inc., San Jose, CA (US)

( * ) Notice: Subject to any disclaimer, the term of this patent is extended or adjusted under 35 U.S.C. 154(b) by 221 days.

(21) Appl. No.: 15/934,353

(22) Filed: Mar. 23, 2018

(65) Prior Publication Data

US 2019/0294708 A1 Sep. 26, 2019

(51) Int. Cl.
*G06F 16/21* (2019.01)
*G06F 16/18* (2019.01)
*G06F 16/23* (2019.01)

(52) U.S. Cl.
CPC ........ *G06F 16/219* (2019.01); *G06F 16/1873* (2019.01); *G06F 16/2329* (2019.01); *G06F 16/2365* (2019.01)

(58) Field of Classification Search
CPC .............. G06F 16/219; G06F 16/2365; G06F 16/2329; G06F 16/1873
See application file for complete search history.

(56) References Cited

U.S. PATENT DOCUMENTS

| | | | |
|---|---|---|---|
| 5,481,722 A * | 1/1996 | Skinner | G06F 8/71 717/122 |
| 6,505,205 B1 * | 1/2003 | Kothuri | G06F 16/2264 |
| 6,557,012 B1 * | 4/2003 | Arun | G06F 16/219 |
| 6,584,476 B1 | 6/2003 | Chatterjee et al. | |
| 6,598,059 B1 * | 7/2003 | Vasudevan | G06F 16/219 707/999.203 |
| 7,627,615 B2 | 12/2009 | McMahon | |
| 7,836,028 B1 | 11/2010 | Agarwal et al. | |
| 8,266,122 B1 * | 9/2012 | Newcombe | G06F 16/80 707/705 |
| 8,495,015 B2 * | 7/2013 | Freedman | G06F 16/256 707/622 |
| 8,527,480 B1 * | 9/2013 | Van Rotterdam | G06F 16/80 707/695 |
| 8,688,666 B1 | 4/2014 | Briggs et al. | |
| 8,732,127 B1 * | 5/2014 | van Rotterdam | G06F 16/93 707/638 |

(Continued)

*Primary Examiner* — Vincent F Boccio
*Assistant Examiner* — Zuheir A Mheir
(74) *Attorney, Agent, or Firm* — FIG. 1 Patents (57) ABSTRACT

In various example embodiments, a system and method for versioning data in an unstructured data store are presented. The method includes generating a first record in the unstructured data store based on a version of a second record in the unstructured data store. The method further includes initializing a parent version identifier of the first record based on the version of the second record. The method further includes comparing the parent version identifier of the first record to a version identifier of the second record. The method further includes determining whether the first record is consistent based on the comparison.

20 Claims, 5 Drawing Sheets

(56) References Cited

U.S. PATENT DOCUMENTS

| | | | | |
|---|---|---|---|---|
| 8,868,506 B1* | 10/2014 | Bhargava | | G06F 16/2379 |
| | | | | 707/648 |
| 8,898,122 B1* | 11/2014 | van Rotterdam | | G06F 16/835 |
| | | | | 707/695 |
| 8,914,414 B2 | 12/2014 | Jacobson et al. | | |
| 9,020,887 B2* | 4/2015 | Ngo | | G06F 17/2288 |
| | | | | 707/610 |
| 9,652,485 B1 | 5/2017 | Bhargava et al. | | |
| 9,659,077 B2* | 5/2017 | Chen | | G06F 11/1461 |
| 9,678,978 B2 | 6/2017 | James et al. | | |
| 10,209,979 B2* | 2/2019 | Fryc | | G06F 8/65 |
| 10,261,997 B2* | 4/2019 | Braudes | | G06F 16/00 |
| 10,853,316 B1* | 12/2020 | Bole | | G06F 16/152 |
| 2003/0120600 A1* | 6/2003 | Gurevich | | G06F 9/4493 |
| | | | | 705/50 |
| 2003/0149709 A1* | 8/2003 | Banks | | G06F 16/273 |
| 2005/0018853 A1* | 1/2005 | Lain | | H04L 63/064 |
| | | | | 380/277 |
| 2005/0050059 A1* | 3/2005 | Van Der Linden | | G06F 16/86 |
| 2007/0299969 A1* | 12/2007 | Kunitake | | G06F 16/93 |
| | | | | 709/225 |
| 2008/0104141 A1* | 5/2008 | McMahon | | G06F 40/197 |
| 2008/0148146 A1* | 6/2008 | Estrada | | G06Q 10/10 |
| | | | | 715/810 |
| 2012/0016849 A1* | 1/2012 | Garrod | | G06F 16/2329 |
| | | | | 707/695 |
| 2013/0046741 A1* | 2/2013 | Bentley | | G06F 16/1873 |
| | | | | 707/695 |
| 2014/0188803 A1* | 7/2014 | James | | G06F 16/178 |
| | | | | 707/638 |
| 2015/0120663 A1* | 4/2015 | Le Scouarnec | | G06F 16/178 |
| | | | | 707/638 |
| 2015/0378972 A1* | 12/2015 | Kapadia | | G06F 40/197 |
| | | | | 715/229 |
| 2015/0379065 A1* | 12/2015 | Yoshizawa | | G06F 16/245 |
| | | | | 707/689 |
| 2016/0246837 A1* | 8/2016 | Wikman | | H04L 67/1095 |
| 2016/0320945 A1* | 11/2016 | Brunn | | G06Q 10/101 |
| 2018/0113862 A1* | 4/2018 | Glover | | G06F 40/197 |
| 2018/0145983 A1* | 5/2018 | Bestler | | H04L 9/3236 |
| 2018/0150478 A1* | 5/2018 | Wang | | G06F 16/185 |
| 2018/0189336 A1* | 7/2018 | McHugh | | G06F 12/12 |
| 2018/0307737 A1* | 10/2018 | Xie | | G06F 16/273 |
| 2019/0108268 A1* | 4/2019 | Santiago | | H04L 67/1097 |
| 2019/0196784 A1* | 6/2019 | Sheffer | | G06F 30/00 |
| 2019/0251275 A1* | 8/2019 | Ramrakhyani | | G06F 3/0673 |

* cited by examiner

PROVIDING CUSTOM READ CONSISTENCY OF A DATA OBJECT IN A DISTRIBUTED STORAGE SYSTEM

TECHNICAL FIELD

Embodiments of the present disclosure relate generally to data storage and, more particularly, but not by way of limitation, to providing custom read consistency of a data object in a distributed storage system.

BACKGROUND

Certain data stores may be generated by aggregating data from one or more systems. These data stores may grow to include large amounts of unstructured data, such as data that does not conform to pre-defined models or relational tables. Organizations may manage these data stores as a centralized data source. Entities within these organizations may consume portions of the data from these centralized data stores in the course of maintaining their information domain. As these data stores increase in size, the unstructured nature of the stored data, the centralized storage scheme, and the distributed access paradigm, amongst other things, may make it difficult for organizations to manage these data sources, such as to maintain the data sources' consistency and integrity.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A large centralized data store may limit the ability of an organization to scale to meet the needs of their customer base. One technique for addressing this problem may include decentralizing these data stores, such as by partitioning the data managed by the data store and allocating the partitions to entities that own, manage, or otherwise consume, respective portions of the data. Decentralizing a large data store that manages unstructured data, however, may be difficult. Such unstructured data stores, for example, may include data objects (e.g., sets of data partitioned allocated to data structures having specific attributes) that are generated by aggregating data from several data sources (e.g., computing systems generating unstructured data). It may not be practical to allocate such a data object to a single entity, such as to cause the entity to maintain the integrity or consistency of the object data. This is because a given entity may not be aware of, or may be able to reliably manage, all producers and consumers of data in the data object. Additionally, when a data object is produced from data aggregated from a large number of producers, and is accessed by several consumers, an entity managing the data object may become a resource bottleneck, limiting the efficiently of the data stores of an organization. Furthermore, an entity may have difficulty maintaining the integrity of a data object from the perspective of consumers of the data object because each consumer may have different requirements or tolerance for reacting to, or for consuming, changes in the data object.

Embodiments of the present disclosure are based on the recognition that hierarchical conjoint versioning techniques (e.g., systems, methods, instruction sequences, and computing machine program products) may be used to efficiently decentralize an unstructured data store, such as by mitigating or overcoming the stated difficulties or limitations of current decentralization techniques. Such hierarchical conjoint versioning techniques may include distributing the storage of a data object amongst two or more nodes of a distributed storage system, for example, by maintaining a core data object at a root node, such that the root node is the most superior node in a logical hierarchical configuration of the two or more nodes. Such a configuration may be referenced herein as a logical graph. The core object may contain data shared by two or more nodes in the logical graph. An entity that augments the core object with additional data may store the additional data in a child node associated with the respective entity. Similarly, another entity which augments data stored in a child node may store this data in a subsequent child node associated with the other entity. A data object in a given node may be associated with a node version identifier to indicate a version of the data object, a parent version identifier to indicate a version of a data object stored in the parent node to which the given node is updated, and an update criteria to indicate rules or conditions for triggering an update of the given node in response to a change in data managed by the parent node.

According to various embodiments, a change to a data object of a given node, such as a parent node, may cause an update to the node version identifier of the given node, for example, by increasing the node version number when the version identifier is numeric. Such a change may also cause an update event (e.g., a data update event) associated with the change to be broadcasted to one or more child nodes of the given node.

A child node receiving the data update event may determine, based on the data update event and based on a predetermined update criteria, whether to update a data object managed by the child node. The child node may also update the node version number of the child node in response to the update event and the update criteria. In some embodiments, the child node may further determine, based on the data update event and the update criteria, whether to update the parent version number of the child node. In certain embodiments, the child node may update the parent version identifier of the child node in response to receiving the data update event. In certain embodiments, the child node may update the node version identifier of the child node in response to receiving the data update event and the update criteria (e.g., in response to updating the data object managed by the child node).

According to various embodiments, a consumer entity (e.g., a computing system that consumes data from one or more nodes of a distributed storage system) may aggregate data from selected nodes in the distributed storage system, such as by logically traversing the logical graph and comparing the parent version identifier of each selected node to the version identifier of the parent node of the selected node. A match between the parent version identifier of a selected node and the version identifier of the parent node of the selected node may indicate that data in the selected node is consistent or accurate with respect to other nodes in the distributed storage system, such as to enable the consumer entity to retrieve data from the selected node. In some embodiments, the consumer entity may cause a selected node to update a data object associated with the selected node when the parent version identifier of a selected node does not match the version identifier of the parent node of the selected node. In some embodiments, the consumer entity may refrain from retrieving data from a selected node when the parent version identifier of a selected node does not match the version identifier of the parent node of the selected node.

According to various embodiments, the distributed storage system may be generated from an existing centralized storage system comprising one or more data objects, such as to decentralize the storage system. In these embodiments, the distributed storage system may be generated by allocating a core data object of an unstructured data object in the centralized storage system to a root node of the distributed storage system. The core data object may contain data shared by two or more nodes in distributed storage system or two or more entities in an organization. The graph may then be extended by allocating decorative data (e.g., data that augments the core data object) that is generated by one or more entities to respective child nodes associated with the one or more entities. Each node may be associated with a node version identifier, a parent version identifier, and an update criteria, as described herein. Additionally, a data in the centralized storage system corresponding to data allocated to a given node may be associated with the node version identifier of the given node. Data in the centralized storage system corresponding to the core data object, for example, may be associated with a node version identifier corresponding to the version identifier of the core data object in the root node. Data in both the centralized storage system and the decentralized storage system, including version identifiers, may be dual written, such as to cause a write to data in the centralized storage system, which causes a write to data in a corresponding node of the decentralized storage system, and vice versa. In some embodiments, version identifiers in each system may be compared to determine whether the dual written data is accurate.

As used herein, an entity may include a group or other subunit of an organization. Entities may aggregate and operate on data generated by one or more other entities within an organization or by one or more data source external to an organization. An entity may also generate data generate data that may be used by other entities.

As used herein, a node may refer to one or more computing systems operated or managed by an entity of an organization. The term node may also refer to one or more logical objects instantiated within the memory of, and executed by a processor associated with, a computing system. A node may be associated with one or more databases or other data storage constructs, such as to store data generated by an entity associated. Such nodes may also be associated with one or more software applications configured to enable a node to generate or provide data to an entity. Such software applications may also enable a node to interact with other nodes, entities, or storage systems.

Figure 1:
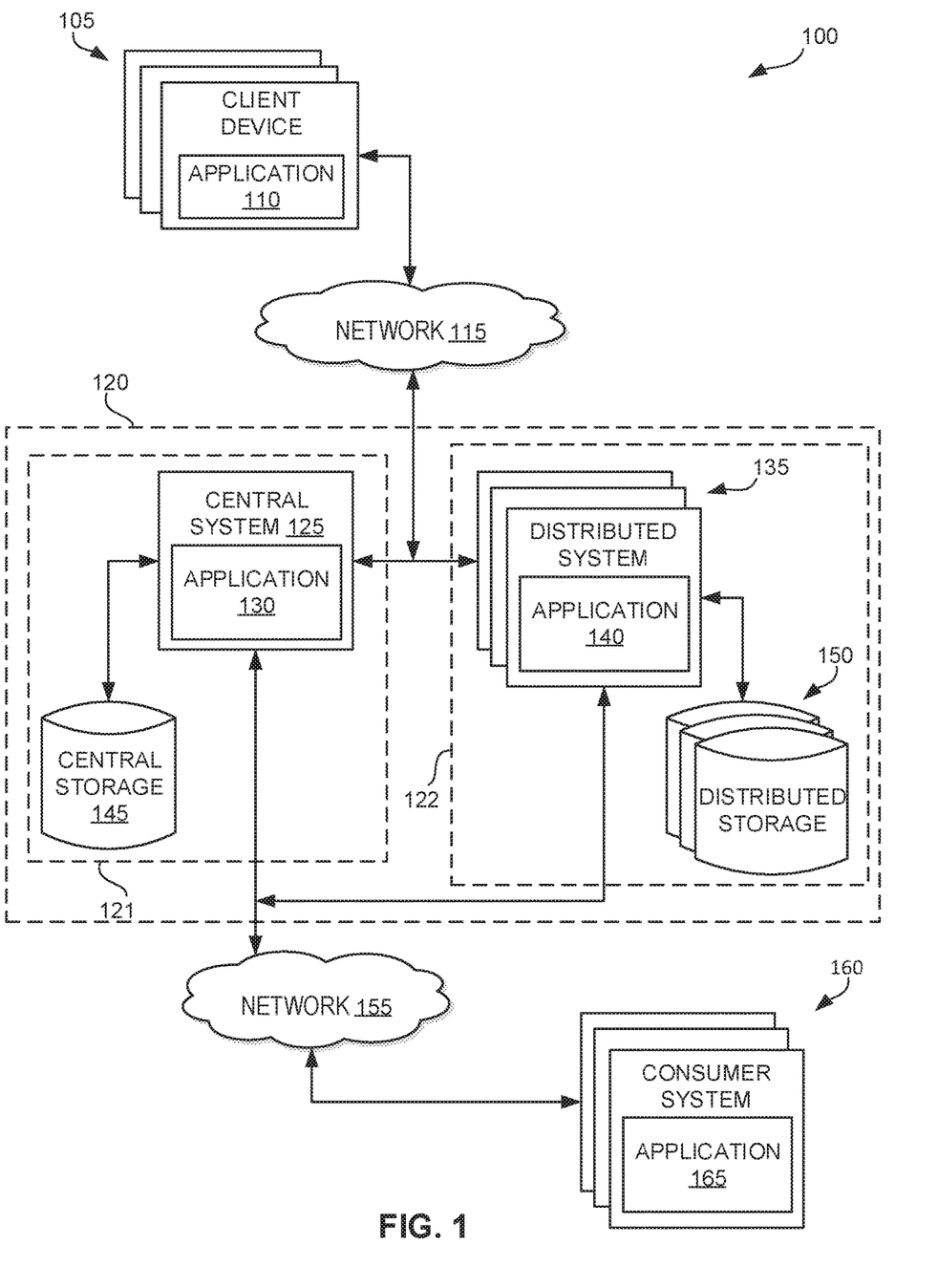
FIG. 1 is a block diagram illustrating an example of a system for providing custom read consistency of a data object in a distributed storage system, according to various embodiments.

With reference to the figures, FIG. 1 is a block diagram illustrating an example of a system 100 for providing custom read consistency of a data object in a distributed storage system, according to various embodiments. The system 100 may be an example of a system configured to decentralize an unstructured storage system. The system 100 provides server-side functionality via a network 115 or the network 155 (e.g., the Internet or wide area network (WAN)) to one or more client devices 105 or to one or more server-side consumer systems 160. Such a system may include client device 105, networks 115 and 155, networked storage system 120, and consumer systems 160.

The client device 105 may include, but are not limited to, a mobile phone, desktop computer, laptop, smart phones, tablets, ultra books, netbooks, laptops, multi-processor systems, or other microprocessor-based or programmable consumer electronics. The client device 105 may be a device of a user that is used to perform a transaction involving digital items within the networked system 120. The client 105, for example, may generate publications for listing on a network-based publication system. Such a listing may include an item offered for sale on a network-based market place and may be stored as a core data object in the network system 120. The client device 105 may include one or more applications 110 (also referred to as "apps"). Such applications may cause the client device 105 to generate a listing of an item for sale using information received from a user. Such information may include related data such as images, videos, and text associated with the listing. In some embodiments, the applications 110 may be software applications, such as, but not limited to, a web browser, messaging application, electronic mail (email) application, an e-commerce site application (also referred to as a marketplace application), and the like.

Networked storage system 120 may be a storage system associated with a network-based publication system, such as to receive and store data generated by one or more producers (e.g., client device 105 or consumer system 165). Components of the networked storage system 120 may interface with other systems of the network-based publication system using, for example, the network 115 and the network 155. In some embodiments, the networked storage system 120 may include a distributed storage system 122 comprising distributed systems 135 and distributed databases 150. In certain embodiments, the networked based storage system 120 may additionally include a centralized storage system 122 comprising centralized storage system 125 and central databases 145. Components of the networked storage system 120 may communicate, or otherwise exchange information, using one or more data communication channels, such as a data communication network, or fiber optic or electrical cables.

Figure 6:
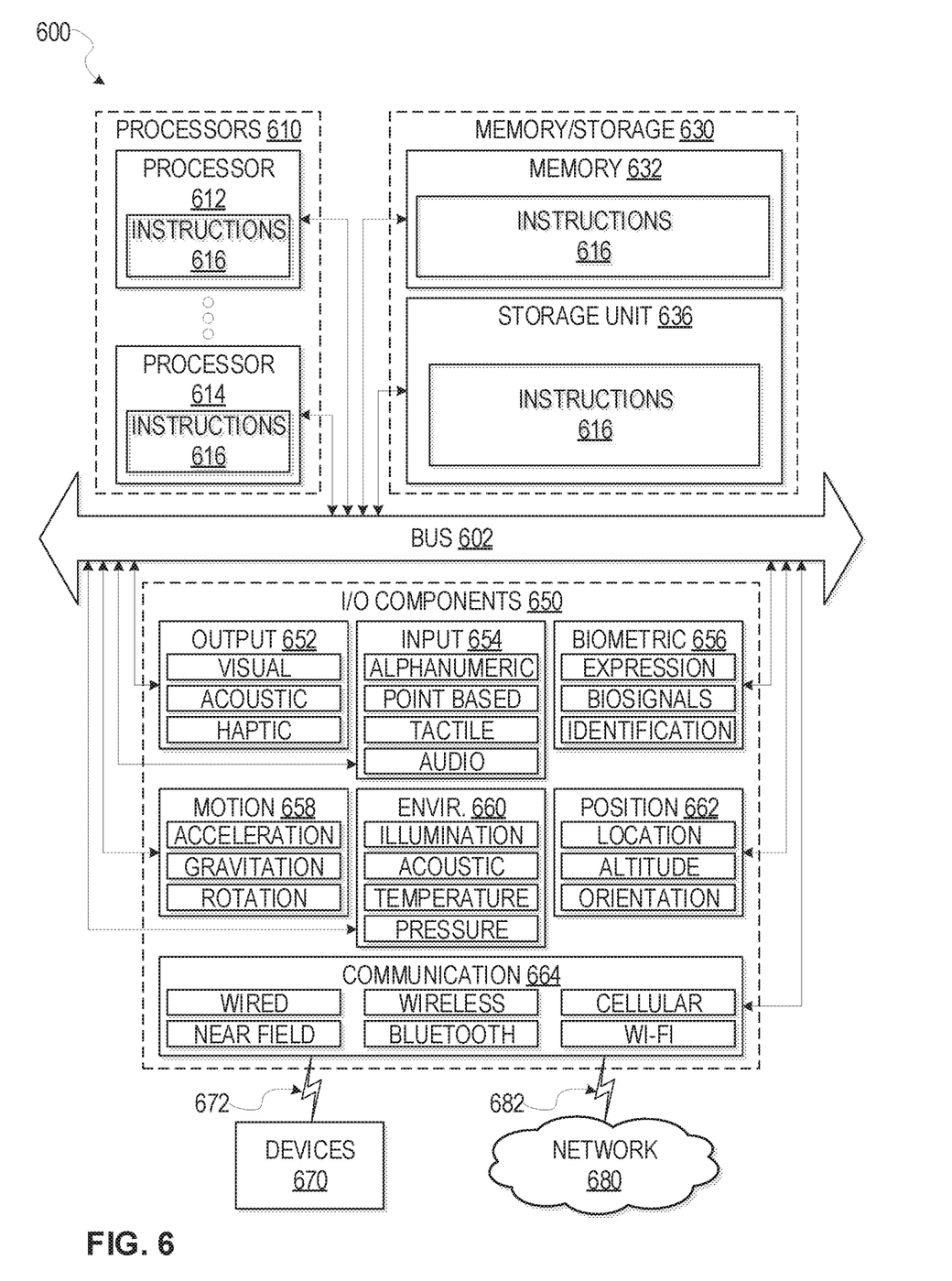
FIG. 6 illustrates a diagrammatic representation of a machine in the form of a computer system within which a set of instructions may be executed for causing the machine to perform any one or more of the methodologies discussed herein, according to various embodiments.

The distributed systems 135 may include one or more computing systems, such as the computing system 600 (FIG. 6). Such computing systems may be configured with one or more software applications 140, such as a database server, or database management system, such as to enable the distributed storage system 135 to receive data from one or more other computing systems associated with the network-based publication system and to store the received data in one or more databases associated with distributed storage devices 150.

In some embodiments, one or more of the distributed systems 135 and one or more of the distributed storage devices 150 may correspond to a node associated with an entity of a network based market place. In other embodiments, one or more of the distributed systems 135 may hosts one or more software based nodes. In these embodiments, the software applications 140 may include applications for coupling two or more nodes in a distributed storage system 120, as described herein. Such applications may include data structures to store node version identifiers, parent version identifiers, and update criteria for each node. Such applications may also include data structures and executable code to logically or physically couple a node to a shared communication channel, such as a data communication bus or a system messaging queue, such as to enable a node transmit to data update events to, and to receive data update events from, one or more nodes in the distributed storage system 120.

The software applications 140, for example, include processes to respond to data updates of data objects associated with a node. Such processes may detect a change to a data object associated with a node and generate an update event in response to the change. The data update event (e.g., a message transmitted to indicate the data update event) may include a data structure configured to be transmitted over a shared communication channel. Such a data structure may include an identifier of the node and an indicator of a type of data update executed by the node. The indicator of the type of data update may indicate, for example, a quantity of data changed (e.g., a number of bytes), a particular type of data changed (e.g., a price or available quantity of a listing), or an address or other indicator of the data changed. Such processes may transmit the data structure over the shared communication channel to broadcast the update event. Such processes may also update a node version identifier of the node in response the data change.

The applications 140 may additionally include processes configured to listen to a shared communication channel to cause a given node to detect and respond to data update events transmitted by a parent node. Such processes, for example, may detect a data update event transmitted by a parent node of a current node and evaluate the indicator of the type of data update against an update criteria of the current node. Such processes may cause the current node to update a data object when the evaluation indicates that the current node is interested in the update to the data object indicated of the parent node. Such updating may include updating the node version identifier of the current node and data of the current node that was derived from the data object of the parent node. These processes may also cause an update to the parent version identifier of the current node in response to the evaluation or in response to receiving the data update event.

Distributed storage devices 150 may include one or more storage devices for storing databases associated with distributed system 135. Such data storage devices may include solid state drives, hard disk drives, network based storage systems, and other storage devices. In some embodiments, the distributed storage devices 150 may be stored at different physical locations. Software applications associated with the distributed storage devices 150 or the distributed system 135 (e.g., applications 140) may create an abstraction layer which stitches together disparate portions of one or more distributed storage devices to create a single data object or view of a data object that is managed by a given node in a distributed storage system.

The central system 125 may be a computing system configured to aggregate data from two or more consumers, such as client device 105 and consumer systems 160. The aggregated data may be stored on central database or repository, such as on the central storage device 145. Application 130 may include data structures and executable code to associate node version indictors with data allocated to specific nodes in a distributed system derived from the centralized storage system 121, as described herein. The application 130 may additionally include executable code to update the node version identifiers. As described herein.

The consumer system 160 may be one or more computing systems configured to consume data stored in the networked data storage system 120. In some embodiments, the consumer system 160 may include one or more software applications 165 to aggregate data stored in nodes of the centralized storage system 121 or the distributed storage system 122, as described herein. In certain embodiments, the consumer system 160 may include client devices 105.

Figure 2:
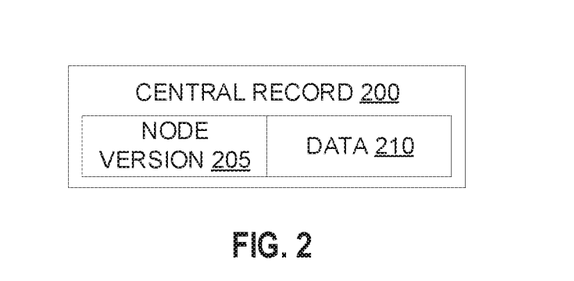
FIG. 2 is a diagram of an example of a data structure associated with a versioned data object in a centralized storage system, according to various embodiments.

FIG. 2 is a diagram of an example of a data structure 200 associated with a versioned data object in a centralized storage system, according to various embodiments. In some embodiments, the data structure 200 may be stored with versioned data object in the centralized storage system, while in other embodiments, the data structure may be stored in applications (e.g., application 130 of FIG. 1), computing systems (e.g., central system 125 of FIG. 1), or data stores separate from the versioned data object. The data structure 200 may include a node version identifier 205 and a data field 210. The node version identifier 205 may be a version number or another indicator of a version of a data object, such as to indicate a current state of, or changes to, the versioned data object. The data field 210 may indicate the extents, address range, or other identifier of the versioned data object in the storage system. In some embodiments, data field 210 contains the versioned data object.

Figure 3:
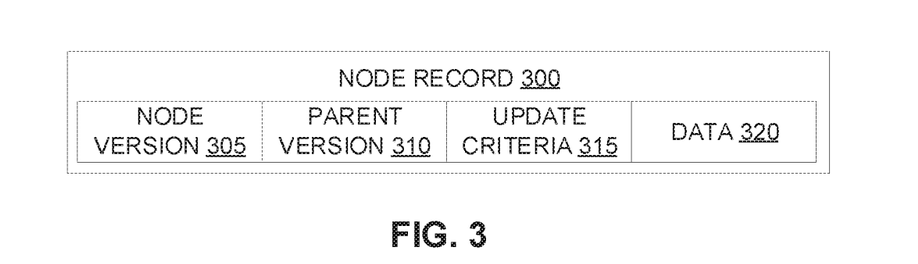
FIG. 3 is a diagram of an example of a data structure associated with a versioned data object in a node of a distributed storage system, according to various embodiments.

FIG. 3 is a diagram of an example of a data structure 300 associated with a versioned data object in a distributed storage system (e.g., data store 122 of FIG. 1), according to various embodiments. In some embodiments, the data structure 300 may be stored with a versioned data object in the distributed storage system (e.g., in a node of the distributed storage system), while in other embodiments, the data structure may be stored in applications (e.g., application 140 of FIG. 1), computing systems (e.g., distributed system 135 of FIG. 1), or data stores separate from the versioned data object. The data structure 300 may include a node version identifier 305, a parent version identifier 310, update criteria 315, and a data field 320. The version identifier 305 may be a version number or another indicator of a version of a data object, such as to indicate a current state of, or changes to, the versioned data object. Similarly, the parent version identifier 310 may be a version number or another identifier of a version of a data object of a parent node to which current node was lasted updated, such as to a data consistency between a child node and a parent node. The update criteria 315 may include rules or conditions for triggering an update of the current node in response to a change in data managed by a parent node. Such rules may indicate a particular portion of a data object associated with a parent node, the modification of which may cause the current node to update to the latest version of the data object of the parent node. The data field 320 may indicate the extents, address range, or other identifier, of data associated the current node. In some embodiments, data field 320 may contain the versioned data object.

Figure 4:
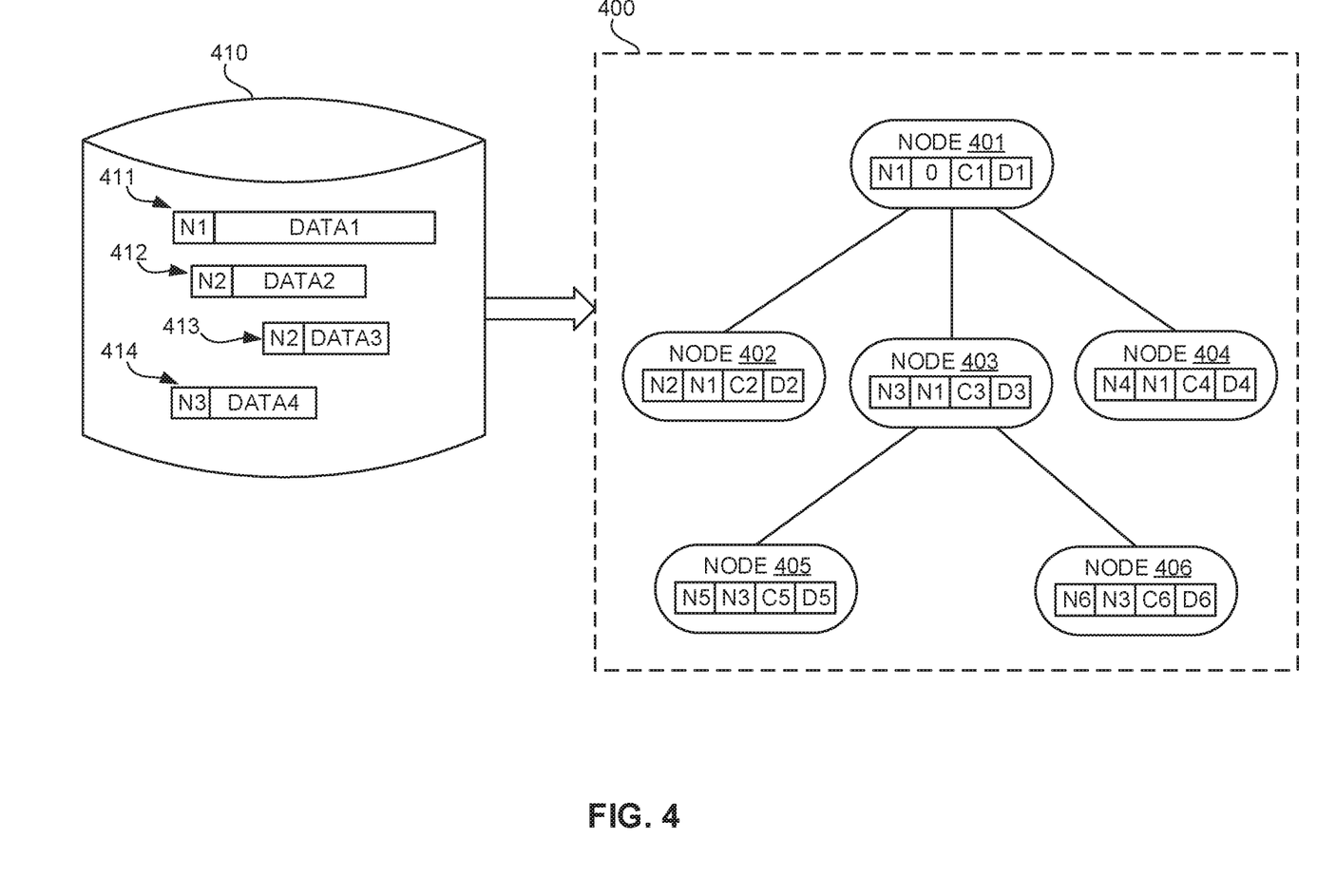
FIG. 4 is a diagram of an example of a relationship between versioned data objects in a centralized storage system and versioned data objects in a distributed storage system, according to various embodiments.

FIG. 4 is a diagram of an example of a relationship between versioned data objects in centralized storage system 410 and versioned data objects in a distributed storage system 400, according to various embodiments. The centralized storage system 410 may be a conceptual example of the centralized storage system 121 (FIG. 1). The distributed data store 400 may be a conceptual example of the distributed storage system 122 (FIG. 1).

In example embodiments, node 401 may be a root node of the distributed storage system 400. The node 401 may include a versioned data object having a node version identifier N1, a null parent version identifier, an update criteria C 1, and a data field value D1. When the distributed storage system 400 is generated from the centralized storage system 410, the versioned data object may correspond to version data object 411, such that both data objects include the same node version identifier N1. Such correspondence may also indicate that the data object associated data field value D1 is either a copy of, or is derived from, DATA1. Similarly, nodes 402, 403, and 404 may include data objects corresponding to versioned data objects 412, 413, and 414, respectively.

Node 401 may be a parent node of nodes 402, 403, and 404, while node 403 may be a parent node of nodes 405 and 406. In some embodiments, a parent node may share, or provide, a common data object to each child node. A child node may generate, or otherwise, maintain data that may be combined with data derived from at least a portion of the shared core data object to generate an output of the child node.

According to various embodiments, a consumer system interested in data of selected nodes in the distributed data store 400 may execute a two-step process, such as to verify the consistency of the selected nodes and to aggregate data from the selected nodes by traversing the hierarchical structure of the distributed storage system from root node to child node. For example, a consumer system interested in the data of nodes 401, 403, and 405 may verify the consistency of data objects in each of the three nodes by determining whether the parent version identifier of each child node matches the node version identifier of their parent node. The consumer system may determine that node 403 is consistent with node 401 because the parent version identifier of node 403 (e.g., N1) matches the node version identifier of node 401 (e.g., N1). Similarly, the consumer system may determine that node 405 is consistent with node 403 because the parent version identifier of node 405 (e.g., N3) matches the node version identifier of node 403 (e.g., N3). After verifying the consistency of selected nodes 401, 403, and 405, the consumer system may traverse the distributed data store 400 from node 401 to node 405 to retrieve the selected data.

Figure 5:
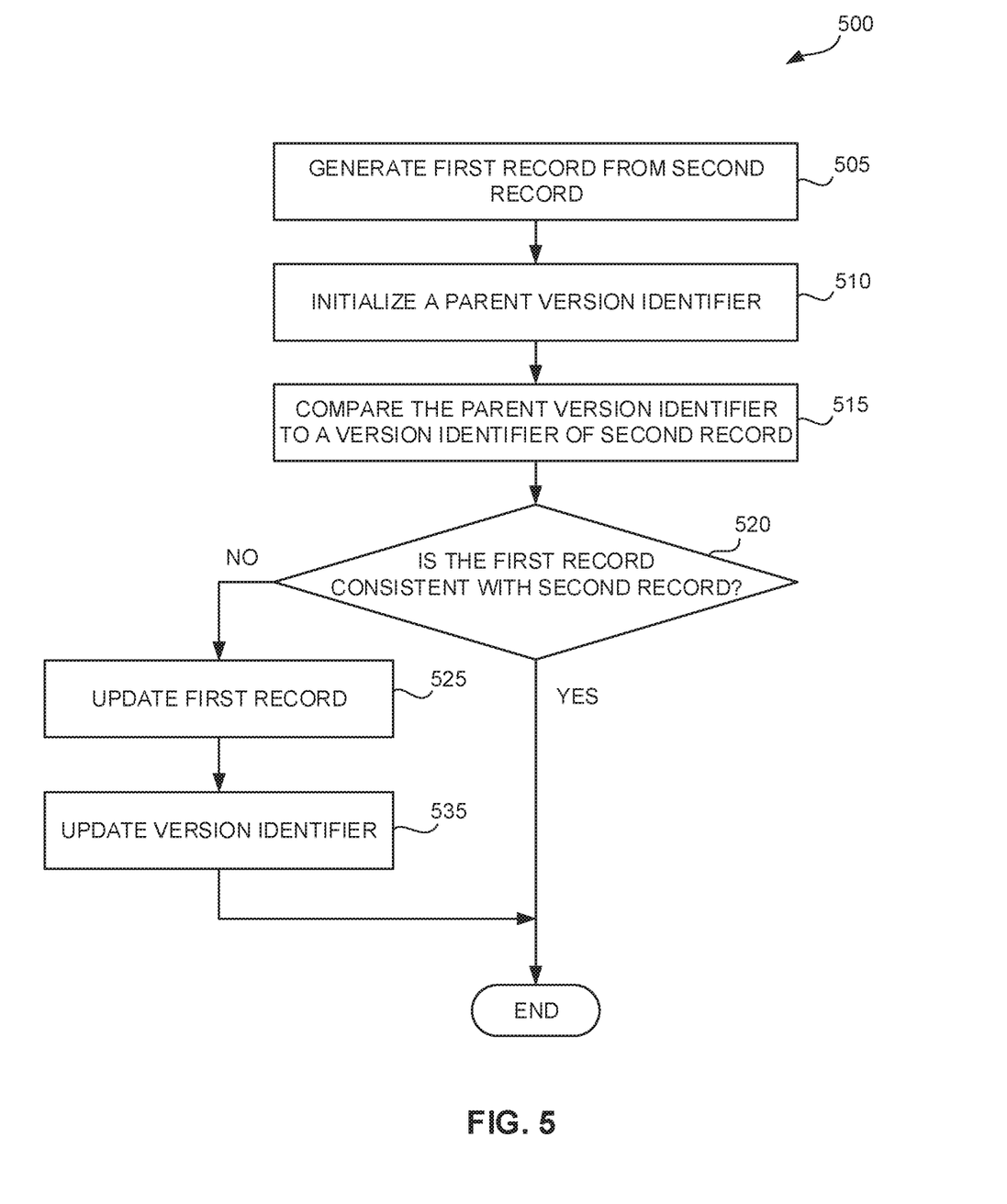
FIG. 5 is a diagram of a set of operations for providing custom read consistency of a data object that is decomposed into a distributed storage system according to various embodiments.

FIG. 5 is a diagram of a set of operations 500 for providing custom read consistency of a data object that is decomposed into a distributed storage system according to various embodiments. The operations 500 may be executed by a node or a managing entity (e.g., a storage manager, a server application, or other software application) in a distributed storage system, such as the distributed storage system 400 (FIG. 4) or the distributed data storage system 122 (FIG. 1), such as to update the distributed a data object in the distributed storage system. The following discussion assumes that a node of a distributed storage system executes the operations 500. It should, however, be understood that the steps of operation 500 and associated discussion are substantially the same if another managing entity or computing system executed the operations 500.

At operation 505, the node may generate a data object (e.g., a first record) from an existing data object (e.g., a second record). Such generating may include executing one or more operations using the second data object to derive the first data object. Such generating may also include identifying an update criteria for determining when to react to a change in the second data object, such as to execute operations to update the first data object. The generating may additionally include generating and associating a versioning data structure (e.g., data structure 300 of FIG. 3) with the first data object.

At operation 510, the node may initialize a parent version identifier of the first data object to the node version identifier of the second data object. Such initializing may include executing one or more operations to retrieve the node version identifier of a node that produce the second data record. The initializing may also include storing the retrieved version identifier, or another indicator derived from the retrieved version identifier, in the parent version identifier field of a versioning data structure associated with the first data object.

At operation 515, the node may compare the parent version identifier of the first data object to a node version identifier of the second data object. Such comparing may include executing one or more operations to transform or convert the parent version identifier and the version identifier of the second data object to the same format or data type comparing may also include determining a difference between the identifiers.

At operation 520, the node may determine whether the first data object is consistent. Such determining may be based on determining that the parent version identifier of the first data object is equal or equivalent to the node version identifier of the second data object. The first data object may be consistent when the first object is updated with, or is generated using, the most recent version of the second data object that satisfies the first node's update criteria for the second data object, as described herein. The node may proceed to operation 525 when the first data object is not consistent, while the node may end execution of the operations 500 based on the first data object being consistent. In some embodiments, the node may specifically refrain from updating the first data object when the first data object is consistent.

At 525, the node may update the first data object. Such updating may include retrieving the latest version of the second data object and executing one or more operations using the retrieved version second data object to derive or generate a new version of the first data object. The updating may also include transmitting a message indicating the update over a shared communication channel. The message may include an indication of the portion of the first data object updated, or an indication of the type of update.

At operation 530, the node may update its node version identifier, for example, by incrementing the node version identifier when the identifier is numeric.

In some embodiments, the operations 500, beginning at operation 515, may be executed in response to receiving a request to retrieve a data object from the node.

In certain embodiments, the operations 500, beginning at operation 515, may be executed in response to receiving an update message indicating that a parent node was updated. In these embodiments, the operations 500 may additionally include updating the parent version identifier after receiving the update message. In specific embodiments, the parent version identifier may be updated after determining that the first data object is consistent with the second data object.

In some embodiments, the node may generate a third data object from the second record. The node may then compare the parent version identifier of the first data object to the parent version identifier of the third data object, such as to determine whether the first data object is consistent with the second data object.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions may cause the machine to execute the flow diagrams of FIG. 5. The instructions transform the general, non-programmed machine into a particular machine programmed to carry out the described and illustrated functions in the manner described. In alternative embodiments, the machine 600 may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

In some embodiments, the instructions 616 may include software applications and associated processes such applications 110, 130, 140, and 165.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of versioning data in an unstructured data store, the method comprising:
    generating a first record in the unstructured data store by augmenting data stored in a second record in the unstructured data store with additional data such that the first record includes both the data stored in the second record and the additional data that is not stored in the second record, the first record stored in a child node of the unstructured data store and the second record stored in a parent node of the unstructured data store;
    in response to a request to retrieve the first record, determining whether the first record is not consistent with the second record by:
        traversing the parent node and the child node in the unstructured data store;
        comparing a parent version identifier associated with the first record stored in the child node to a version identifier associated with the second record stored in the parent node; and
        determining that the first record is not consistent with the second record based on the parent version identifier associated with the first record stored in the child node not matching the version identifier associated with the second record stored in the parent node;
    in response to determining that the first record is not consistent with the second record, retrieving a latest version of the second record, updating the first record stored in the child node by executing one or more operations using the retrieved latest version of the second record to generate an updated version of the first record, and updating the parent version identifier associated with the first record stored in the child node; and
    providing data aggregated from the latest version of the second record and the updated version of the first record in reply to the request, wherein the first record is associated with the parent version identifier, a node version identifier, and an update criteria comprising one or more rules or conditions for triggering an update of the child node in response to a change in data managed by the parent node, and wherein the parent version identifier, the node version identifier, and the update criteria are stored in the child node.

2. The method of claim 1, further comprising:
    receiving a data update event broadcast from the second record to the first record: and
    updating the first record in response to:
        the determination that the first record is not consistent with the second record, and
        a determination that the update criteria applied to the data update event is satisfied.

3. The method of claim 2, further comprising updating the first record with data derived from the data currently stored in the second record and updating a version identifier of the first record to a current version identifier of the second record.

4. The method of claim 3, wherein the data update event is broadcast by the second record to one or more child records in response to an update to the second record.

5. The method of claim 1, further comprising refraining from updating the first record in response to a determination that the first record is consistent with the second record.

6. The method of claim 1, further comprising:
    determining that the first record is consistent with the second record by determining that the first record is updated with a most recent version of the second record that satisfies the update criteria.

7. The method of claim 1, further comprising:
    receiving, from a shared communication channel, a data update event indicating that the second record was updated;
    applying the update criteria associated with the first record to the data update event;
    updating the first record in response to determining that the update criteria is satisfied; and
    transmitting a second data update event to a third record indicating that the first record was updated.

8. The method of claim 1, wherein the determining whether the first record is not consistent with the second record comprises determining whether the second record was generated from a most recent version of the second record.

9. A system for versioning data in an unstructured data store, the system comprising:
    at least one computing device comprising a hardware processor and a memory, the memory having computer executable instructions embedded therein, the computer executable instructions executable by the hardware processor to cause the computing device to:
        generate a first record in the unstructured data store by augmenting data stored in a second record in the unstructured data store with additional data such that the first record includes both the data stored in the second record and the additional data that is not stored in the second record, the first record stored in a child node of the unstructured data store and the second record stored in a parent node of the unstructured data store;
        initialize a parent version identifier of the first record based on a version identifier of the second record;
        receive a data update message indicating that the data stored in the second record has changed;

apply an update criteria associated with the first record to the data update message;

set the parent version identifier of the first record to an updated version identifier of the second record when the update criteria is not satisfied; and in response to a request to retrieve the first record, determine whether the first record is not consistent with the second record by:

traversing the parent node and the child node in the unstructured data store;

comparing the parent version identifier of the first record stored in the child node to a current version identifier of the second record stored in the parent node; and determining that the first record is not consistent with the second record based on the parent version identifier associated with the first record stored in the child node not matching the current version identifier of the second record stored in the parent node;

in response to determining that the first record is not consistent with the second record, retrieving a latest version of the second record, updating the first record stored in the child node by executing one or more operations using the retrieved latest version of the second record to generate an updated version of the first record, and updating the parent version identifier associated with the first record stored in the child node: and providing data aggregated from the latest version of the second record and the updated version of the first record in reply to the request, wherein the first record is associated with the parent version identifier, a node version identifier, and the update criteria, the update criteria comprising one or more rules or conditions for triggering an update of the child node in response to a change in data managed by the parent node, and wherein the parent version identifier, the node version identifier, and the update criteria are stored in the child node.

10. The system of claim 9, wherein the computer executable instructions are further executable by the hardware processor to cause the computing device to update the first record in response to determining that the first record is not consistent with the second record.

11. The system of claim 10, wherein the computer executable instructions are further executable by the hardware processor to cause the computing device to update the second record and to update the version identifier of the second record based on the updating of the first record.

12. The system of claim 11, wherein the computer executable instructions are further executable by the hardware processor to cause the computing device to update a version identifier of the first record based on the updating of the version identifier of the second record.

13. The system of claim 10, wherein the computer executable instructions are further executable by the hardware processor to cause the computing device to:

responsive to the updating, transmit, to a shared communication channel, a data update event indicating that the first record has changed, wherein the data update event indicates a portion of the first record that was updated.

14. The system of claim 9, wherein the computer executable instructions are further executable by the hardware processor to cause the computing device to refrain from updating the first record in response to a determination that the first record is consistent with the second record.

15. The system of claim 9, wherein the computer executable instructions are further executable by the hardware processor to cause the computing device to:

generate a third record in the unstructured data store based on the data stored in the first record in the unstructured data store;

initialize a version identifier of the first record based on a version identifier of the second record;

initialize a parent version identifier of the third record based on the version identifier of the first record; and compare the version identifier of the first record to the parent version identifier of the third record to determine whether the first and third records are consistent.

16. The system of claim 9, wherein the computer executable instructions are further executable by the hardware processor to cause the computing device to:

receive, from a shared communication channel, a data update event indicating that the second record was updated;

apply the update criteria to the data update event;

update the first record in response to determining that the update criteria is satisfied; and transmit a second data update event to a third record indicating the update to the first record.

17. A non-transitory computer-readable storage medium storing a set of instructions for versioning data in an unstructured data store that, when executed by at least one processor of a machine, cause the machine to perform operations comprising:

generating a first record in the unstructured data store by augmenting data stored in a second record in the unstructured data store with additional data such that the first record includes both the data stored in the second record and the additional data that is not stored in the second record, the first record stored in a child node of the unstructured data store and the second record stored in a parent node of the unstructured data store;

initializing a parent version identifier of the first record based on a version identifier of the second record;

traversing the parent node and the child node in the unstructured data store and comparing the parent version identifier of the first record stored in the child node to an updated version identifier of the second record stored in the parent node;

determining that the first record is not consistent with the second record based on the parent version identifier associated with the first record stored in the child node not matching the version identifier associated with the second record stored in the parent node;

in response to determining that the first record is not consistent with the second record, retrieving a latest version of the second record, updating the first record stored in the child node by executing one or more operations using the retrieved latest version of the second record to generate an updated version of the first record, and updating the parent version identifier associated with the first record stored in the child node, wherein the first record is associated with the parent version identifier, a node version identifier, and an update criteria comprising one or more rules or conditions for triggering an update of the child node in response to a change in data managed by the parent node, and wherein the parent version identifier, the node version identifier, and the update criteria are stored in the child node.

18. The non-transitory computer-readable storage medium of claim 17, wherein the operations further comprise:
 receiving a data update event broadcast from the second record to the first record: and
 updating the first record in response to:
  the determination that the first record is not consistent with the second record, and
  a determination that the update criteria applied to the data update event is satisfied.

19. The non-transitory computer-readable storage medium of claim 18, wherein the operations further comprise updating the first record with data derived from the data currently stored in the second record and updating a version identifier of the first record to a current version identifier of the second record.

20. The non-transitory computer-readable storage medium of claim 17, further comprising refraining from updating the first record in response to a determination that the first record is consistent with the second record.

* * * * *